United States Patent [19]

Masuda et al.

[11] Patent Number: 5,062,073
[45] Date of Patent: Oct. 29, 1991

[54] INPUT OUTPUT CONTROL SYSTEM USING A FIFO TO RECORD ACCESS INFORMATION OF CONTROL REGISTERS BY A MASTER DEVICE

[75] Inventors: Hiroki Masuda; Tetsuo Kawamata, both of Yokohama, Japan

[73] Assignee: Fujitsu Limited, Kawasaki, Japan

[21] Appl. No.: 462,883

[22] Filed: Jan. 3, 1990

Related U.S. Application Data

[63] Continuation of Ser. No. 379,733, Jul. 13, 1989, abandoned, which is a continuation of Ser. No. 98,145, Sep. 18, 1987, abandoned.

[30] Foreign Application Priority Data

Sep. 19, 1986 [JP] Japan .................. 61-219126

[51] Int. Cl.$^5$ .................. G06F 3/00; G06F 13/12; G06F 13/20
[52] U.S. Cl. .................. 364/900; 364/927.92; 364/927.99; 364/926.9; 364/926.93; 364/931.44; 364/957.6; 364/965.4
[58] Field of Search ... 364/200 MS File, 900 MS File

[56] References Cited

U.S. PATENT DOCUMENTS

| | | | |
|---|---|---|---|
| 3,979,730 | 9/1976 | Bennett et al. | 364/200 |
| 4,246,637 | 1/1981 | Brown et al. | 364/200 |
| 4,268,906 | 5/1981 | Bourke et al. | 364/200 |
| 4,371,932 | 2/1983 | Dinwiddie et al. | 364/200 |
| 4,475,155 | 10/1984 | Oishi et al. | 364/200 |
| 4,484,263 | 11/1984 | Olson et al. | 364/200 |
| 4,494,190 | 1/1985 | Peters | 364/200 |
| 4,514,823 | 4/1985 | Mendelson et al. | 364/900 |
| 4,591,973 | 5/1986 | Ferris, III et al. | 364/200 |
| 4,593,324 | 6/1986 | Ohkubo et al. | 364/200 |
| 4,783,730 | 11/1988 | Fischer | 364/200 |

OTHER PUBLICATIONS

U.S. patent application Ser. No. 865,516, filed May 21, 1986 (your ref: 522.1067, our ref: FJ-5499-U.S.).

Primary Examiner—Thomas C. Lee
Assistant Examiner—Robert B. Harrell
Attorney, Agent, or Firm—Staas & Halsey

[57] ABSTRACT

A group of control registers for controlling a plurality of input output devices respectively are formed in random access memory which is connected to a microprocessor bus of an input output control device. A history of a program mode access from a central processing apparatus to the RAM is recorded in a first-in first-out memory (FIFO). The microprocessor of the input output control device reads an access information of the FIFO, accesses the group of the control registers on the RAM, and controls the input output device according to the read control information. Thus, control of a plurality of input output devices is carried out by one input output device.

7 Claims, 9 Drawing Sheets

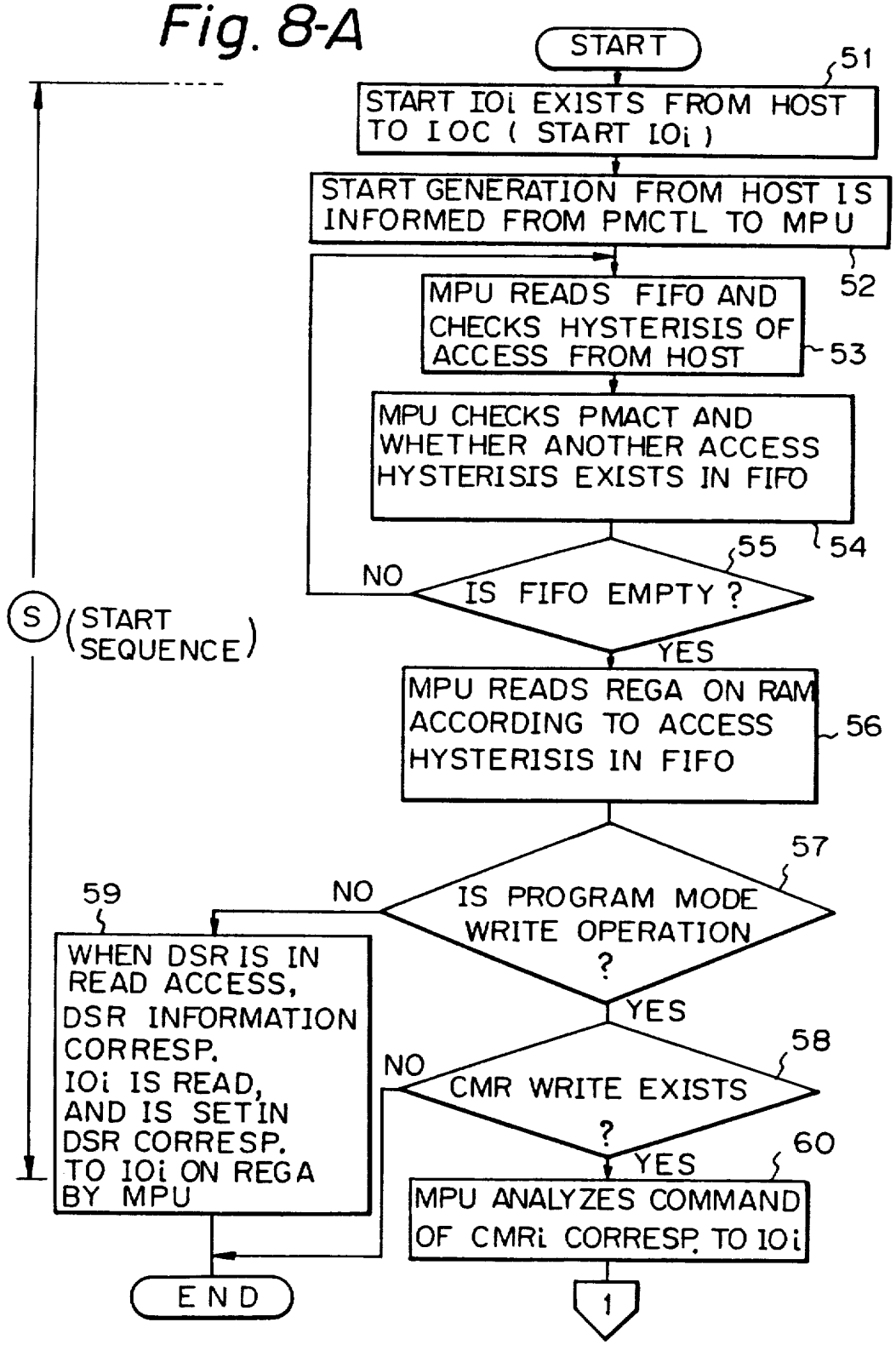
Fig. 8-A

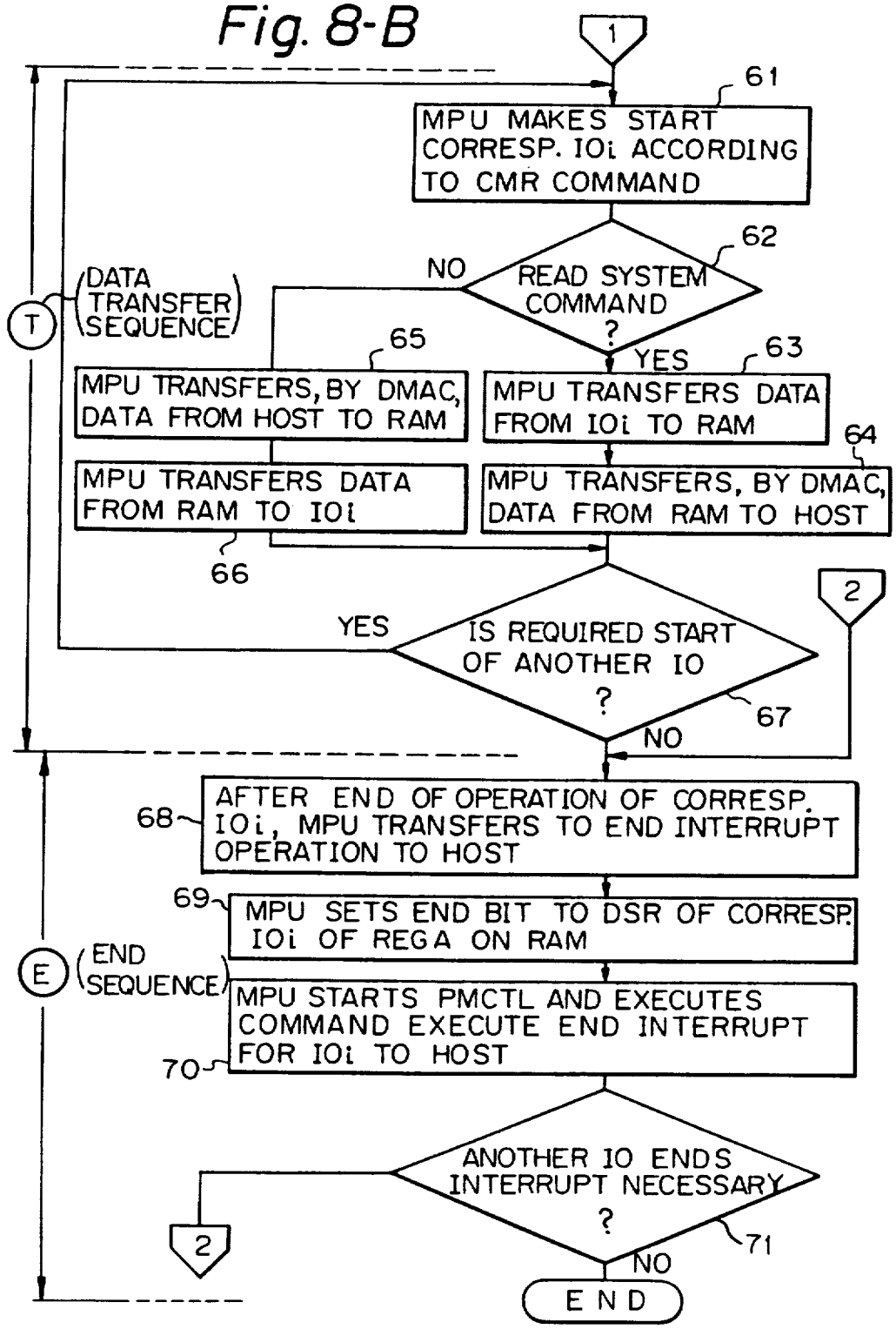

INPUT OUTPUT CONTROL SYSTEM USING A FIFO TO RECORD ACCESS INFORMATION OF CONTROL REGISTERS BY A MASTER DEVICE

This is a continuation of co-pending application Ser. No. 07/379,733 filed on July 13, 1989, which is a continuation of Ser. No. 07/098,145, filed on Sept. 18, 1987, both abandoned.

BACKGROUND OF THE INVENTION

1. Field of the Invention

The present invention relates to a program mode acess control system by which a plurality of input output devices are controlled by one input output control device and a rapid program mode access is made between this input output device and a central processing device.

2. Description of the Related Art

The construction of an input output control device which controls an input output device such as a magnetic tape device, a magnetic disc device, a magnetic floppy device, a line printer, etc., usually comprises a microprocessor, and corresponds to the construction of the input output device. Therefore, a standardization of the input output device is desired.

The conventional processing device, for example, has the construction, described as follows. A processor bus couples a central processing unit, a main memory device and a channel device, a plurality of input output control devices are connected via the channel device and a common bus, and each input output control device is connected to an input output device such as a magnetic tape device, a magnetic disc device, a magnetic floppy device, a line printer, or a display device etc.

Each input output control device is formed by an internal control portion formed by a microprocessor, etc., a receiver driver, a control register, an input output interface circuit, etc. One or a plurality of the same kind of input output devices are connected to the input output interface circuit.

As described above, the conventional input output control device provides a control register formed by a plurality of registers, sets the control information in the control register and reads out the content thereof to carry out the desired control operation. Thus, the control system due to the wired logic is conventionally used. However, due to recent developments in microprocessors, the control system can now be operated with firmware, and a flexible control for the input output device is now possible, which leads to a reduction of the hardware needed.

The construction of the control system on the firmware by such a wired logic corresponds to that of the input output device, such as the magnetic tape device, magnetic disc device, display device, etc. Thus when a plurality of the input output devices are controlled, the control system is restricted to that of one kind of input output device.

However, control of a plurality of the input output device should be made by the same input output control device. In such case, the operating speed of the microprocessor (the internal control portion) in the input output control device cannot follow the access operation for the high speed control register due to command checks from the central processing device side. Further, when using hard logic, much hardware is required for the control register. Thus a unified control of a plurality of different kinds of input output devices becomes difficult.

SUMMARY OF THE INVENTION

The object of the invention is to provide a control of a plurality of the input output devices by one input output control device, in which if a rapid access from the master device such as the central processing unit, etc., to the control register is carried out, a sufficient processing by the microprocessor in the input output control device is carried out.

The above-mentioned objecct can be achieved by providing a program mode access control system in a processing system in which a master device such as a central processing unit or a channel unit and an input output control device which carries out an interface control with each kind of input output device under the control of the master device are connected via a common bus. A program mode access control system comprises an internal processor bus of the input output control device which is connected, together with a microprocessor, by a group of control registers corresponding to a plurality of the input output device, in a random access memory which can be directly accessed from the master device. A first-in first-out memory is connected between the common bus and the internal processor bus. A hysteresis of a program mode access from the master device to the group of the control registers is recorded in the first-in first-out memory, access information recorded in the first-in first-out memory is read by the microprocessor. The content of the control registers is read out in accordance with the access information so that a specified input output device among a plurality of the input output devices is controlled.

Further features and advantages of the present invention will be apparent from the ensuing description with reference to the accompanying drawings to which, however, the scope of the invention is in no way limited.

BRIEF DESCRIPTION OF THE DRAWINGS

FIGS. 8A and 8B are a flow chart for explaining the operation of the system shown in FIG. 3.

DESCRIPTION OF THE PREFERRED EMBODIMENTS

Figure 1A:
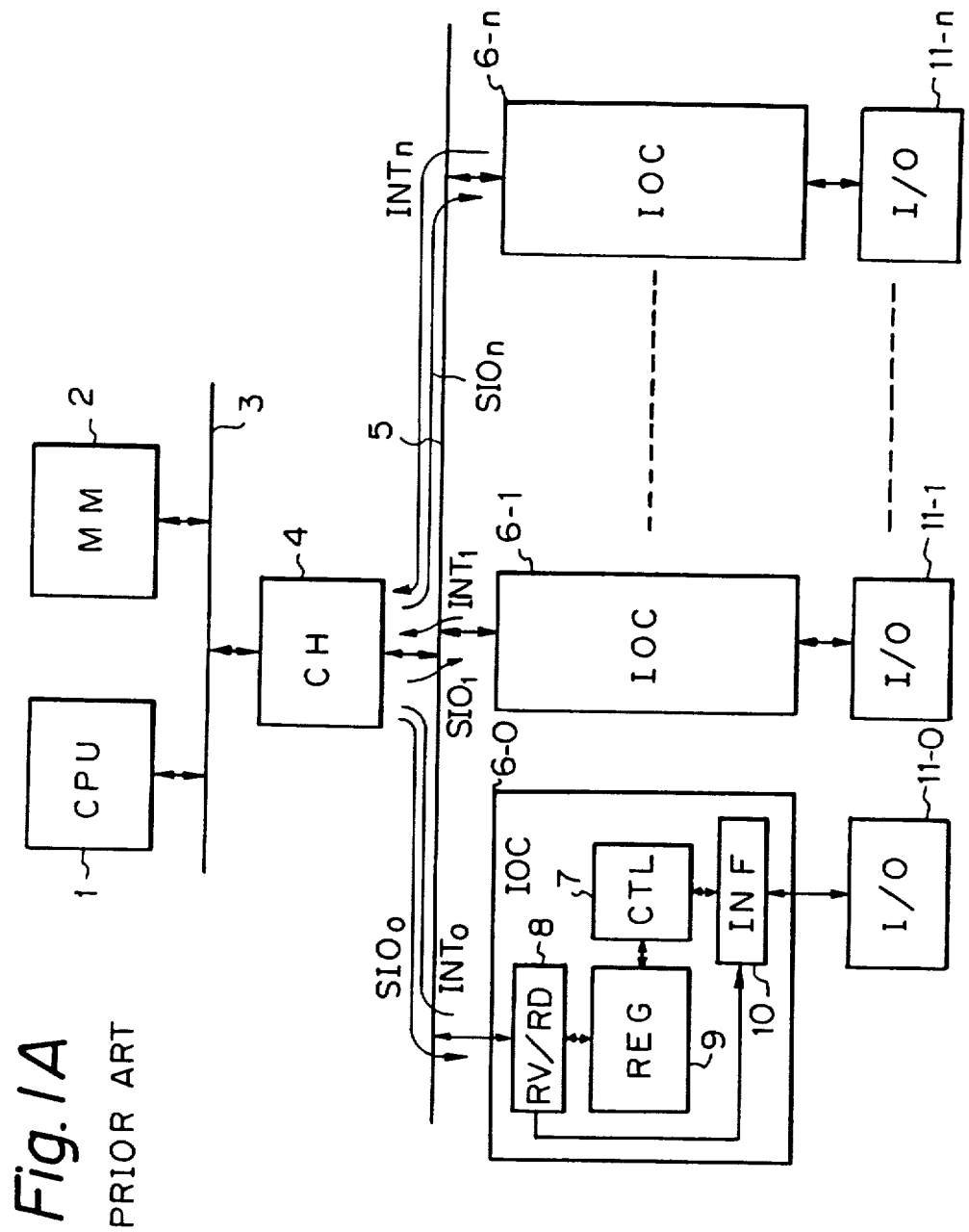
FIG. 1A is a block diagram of one example of a conventional program mode access control system.

A conventional processing device has, for example, a construction shown in FIG. 1A, wherein a processor bus 3 couples a central processing unit (CPU) 1, a main memory device (MM) 2, and a channel device (CH) 4 a plurality of input output control devices (IOC) 6-0, 6-1, ... 6-n are coupled to the channel device 4 via a common bus 5, and. Each input output control device 6-0, 6-1, ... 6-n is connected to an input output device (I/O) 11-0, 11-1, ... 11-n, such as a magnetic tape device, a magnetic disc device, a magnetic floppy device, a line printer, or a display device, etc.

Each input output control device 6-0, 6-1, ... 6-n includes an internal control portion (CTL) 7 formed by a microprocessor, etc., a receiver driver (RV/DV) 8, a control register (REG) 9, an input output interface circuit (INF) 10 etc. One or a plurality of the same kind of input output devices 11-0, 11-1, ... 11-n are connected to the input output interface circuit 10.

The control register 9 includes, for example, a device status register (DSR) which determines whether or not the input output control device is transmitting the data, a byte count register (BCR) showing the number of bytes of the transmitted data, a memory address register (MAR) which specifies the address of the data written in the main memory device 2 or the data read out therefrom, and a command register (CMR) which specifies a read or write operation, etc.

The write operation to the control register REG is carried out by a program mode from the central processing unit 1 via the processor bus 3, the channel device 4, and the common bus 5. In the case, that input output control device 6-0, 6-1, ... 6-n discriminates whether or not its own input output control device is specified in an address collation circuit (not shown in the drawing).

In accordance with the content written in the control register REG, the internal control portion 7 controls the transfer of data from the input output device 11-0, 11-1, ... 11-n to the main memory device 2, from the data read out from the main memory device 2 to the input output device 11-0, 11-1, ..., 11-n. In this case, transfer control of the data is usually carried out by a direct memory access (DMA) system.

Figure 1B:
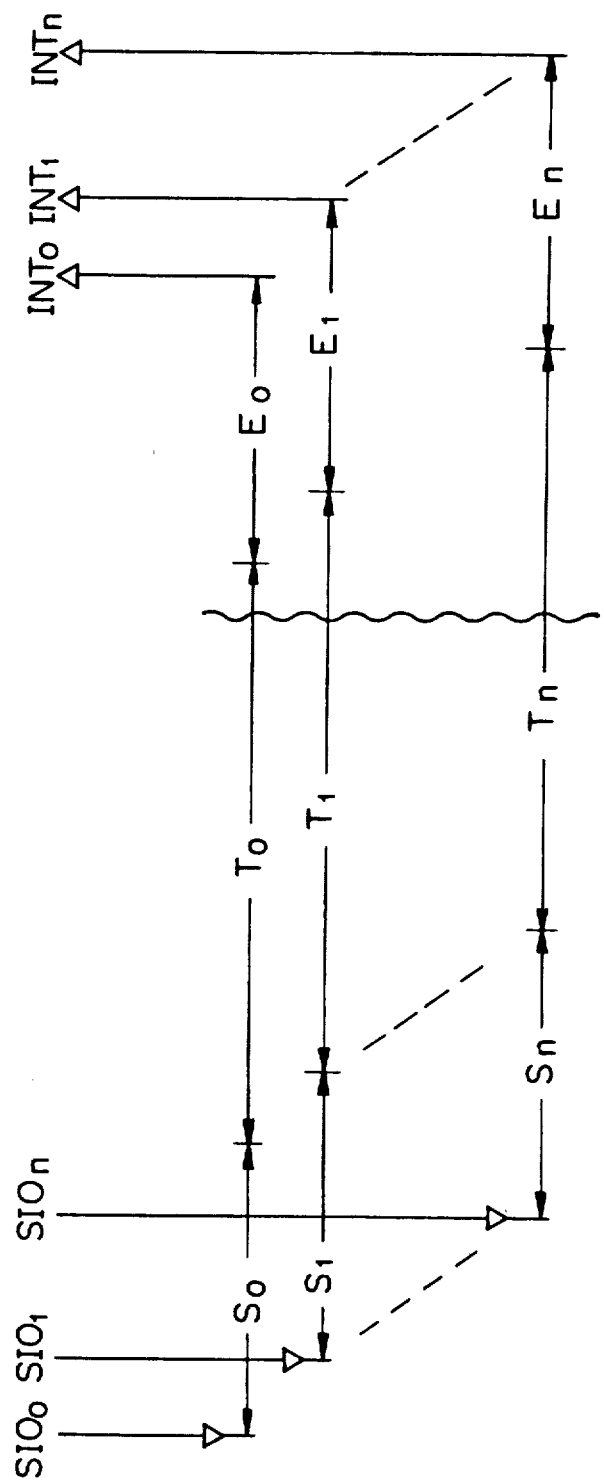
FIG. 1B is a time chart for explaining the operation of the system shown in FIG. 1A.

FIG. 1B is a time chart for explaining the transfer of the data in the device shown in FIG. 1A. In FIG. 1B, $SIO_0$–$SIO_n$ are start commands, $INT_0$–$INT_N$ interruptions, $S_0$–$S_n$ start sequences, $T_0$–$T_n$ data transfer sequences, and $E_0$–$E_n$ end sequences.

As mentioned above, the conventional input output control device 6-0, 6-1, ..., 6-n provided the control register 9 formed by a plurality of registers, sets the control information in the control register 9, and reads out the content thereof so as to carry out the desired control operation. Thus, the control system is limited due to the wired logic. However, due to recent development in microprocessors, the control system can be operated with firmware. A flexible control of the input output device becomes possible, which greatly reduces the hardware needed.

The construction of the control system or the firmware by such a wired logic corresponds to the kind of the input output devices 11-0, 11-1, ... 11-n, such as a magnetic tape device, magnetic disc device, display device, etc. Thus, when a plurality of the input output devices 11-0, 11-1, ..., 11-n are controlled, the conventional control system is restricted to that of one kind of input output device.

Therefore, the control of a plurality of the input output devices by the same input output control device has been considered. In such a case, the operating speed of the microprocessor (the internal control portion 7) in the input output control device 6-0, 6-1, ... 6-n cannot follow the access operation for the high speed control register 9. This is due to command checks from the central processing device 11-0, 11-1, ... 11-n side. Further, when using hard logic, much hardware is required for the control register, and thus a unified control of the plurality of different kinds of input output devices becomes difficult.

An object of the invention is to provide a control a plurality of the input output devices by one input output control device. If it is necessary to carry out a rapid access from the master device, such as the central processing unit, etc. to the control register, a sufficient processing by the microprocessor in the input output control device will be carried out.

In the program mode access control system according to the present invention, the group of control registers corresponding to the plurality of the input output devices are formed in the random access memory. The access operation from the master device side such as the central processing unit, etc., is recorded by using the first-in first-out memory. The content thereof is read out so that the microprocessor carries out the control. An explanation of this operation will be given by referring to FIG. 2.

In a processing system in which a master device 12, such as a central processing unit or a channel unit, and and input output control device 14 which carries out an interface control with each kind of input output devices (I/O) 15-0, 15-1, ..., 15-n under the control of the master device are connected via a common bus 13. An internal processor bus 16 of the input output control device 14 is connected by a microprocessor (MPU) 17, a random access memory (RAM) 18 and an input output device interface circuit (INF) 21, a first-in first-out memory (FIFO) 19 and a receiver driver (RV/DV) 20 are connected between the common bus 13 and the internal processor bus 16. A group of control registers (REGA) 18a are formed in the random access memory 18, corresponding to the plurality of the input output devices 15-0, 15-1, ... 15-n.

A history of a program mode access from the master device 12 to the group of the control registers 18a is recorded in the first-in first-out memory 19. Access information recorded in the first-in first-out memory 19 is read by the process speed of the microprocessor 17. The content of the control registers 18a based on the access information is read out so that a specific input output control device among the plurality of the input output control devices 15-0, 15-1, ..., 15-n is controlled.

The random access memory 18 can be directly accessed from the master device 12 side of the processing system via the receiver driver 20 (RV/DR). When each kind of control information is written in the control register 18a corresponding to the input output device 15-0, 15-1, ..., 15-n by the program mode access, the access information (the information concerning access, write/read, whether or not a parity error is included or not) is recorded at the same time in the first-in first-out memory 19.

The microprocessor 17 reads the access information recorded in the first-in first-out memory 19 and reads the content of the group of control registers 18a according to the access information, to control the input output device 15-0, 15-1, ..., 15-n. Therefore, if high speed access for the group of the control registers 18a corresponding to the plurality of the input output device 15-0, 15-1, . . . , 15-n exists, the microprocessor 17 reads all of the content of the group of the control registers 18a, to control the input output device 15-0, 15-1, . . . , 15-n. Therefore, a plurality of the input output devices 15-0, 15-1, . . . , 15-n can be easily controlled by one input output control device 14.

Figure 2:
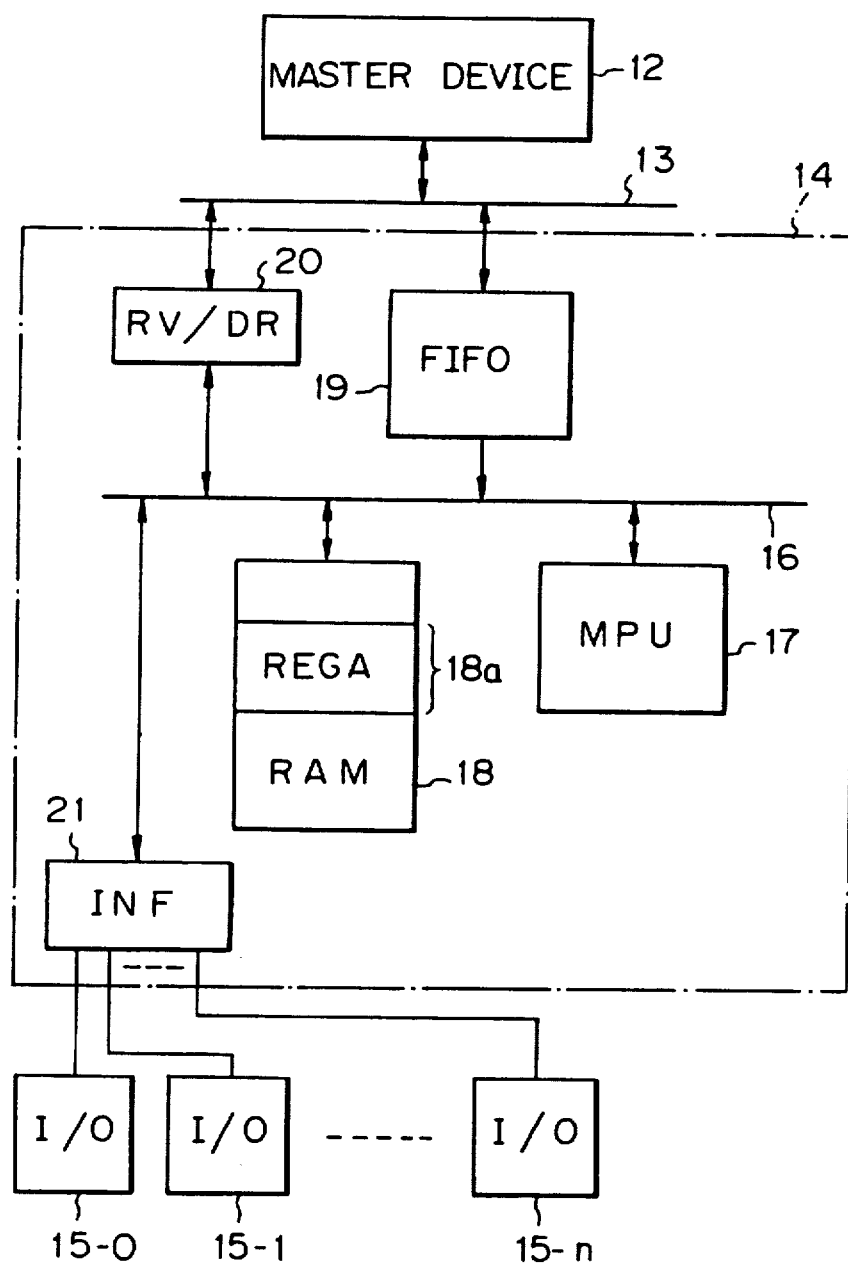
FIG. 2 is a block diagram showing a principle of a program mode access control system of the present invention.

Hereinafter, another embodiment of the present invention will be explained in detail with reference to FIG. 3, in which the same elements as shown in FIG. 2 are designated by the same reference numeral.

Figure 3:
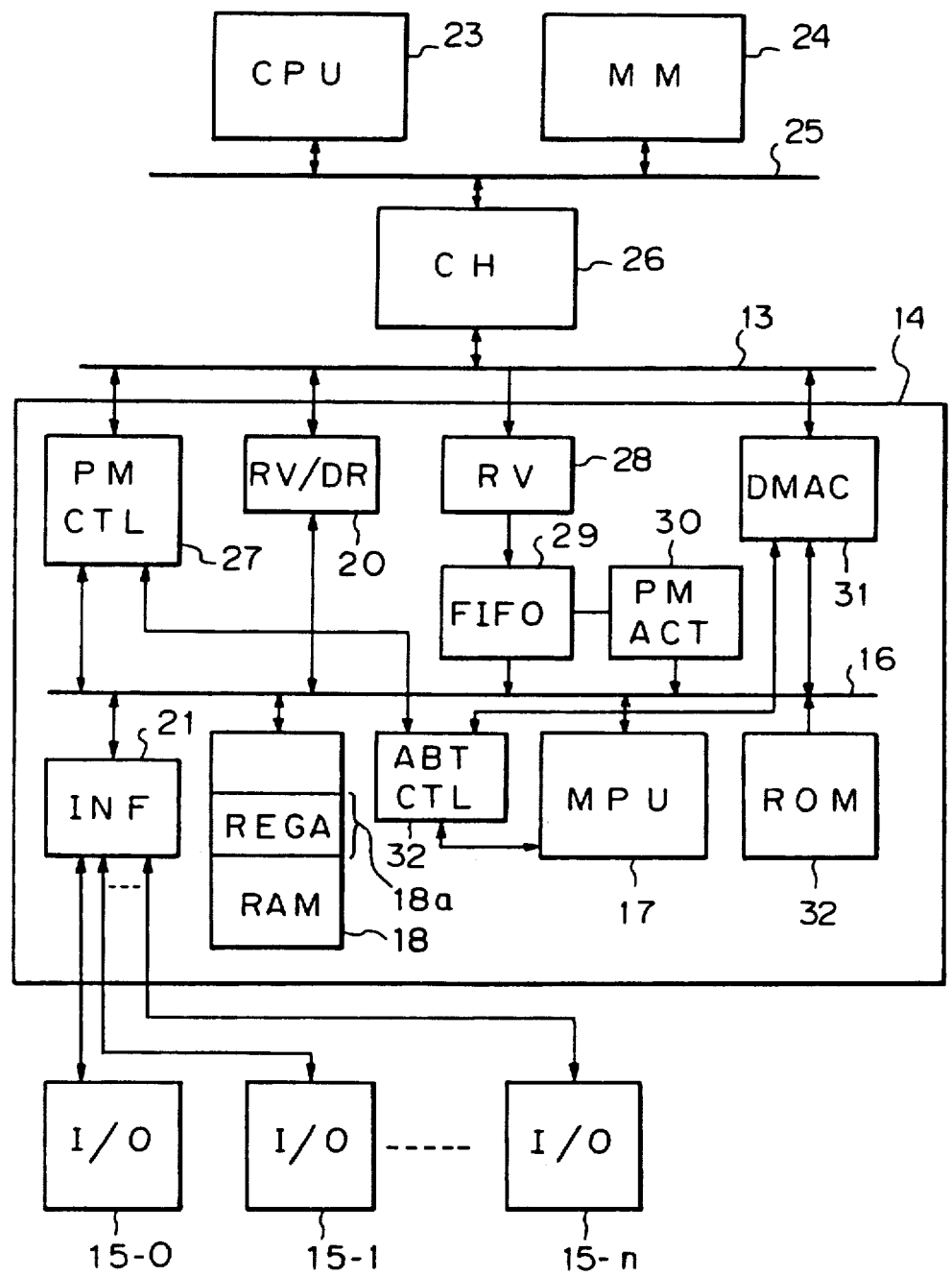
FIG. 3 is a block diagram of one embodiment of the program mode access control system according to the present invention.

In FIG. 3, 23 is a central processing unit (CPU) 23, is connected to a main memory device (MM) 24, through is a processor bus 25. Common bus 13 connects a channel device (CH) 26, a read only memory (ROM) 32 used for storing programs, etc., 18 is a random access memory 18 used for temporarily storing each kind of data. A is a group of control registers (REGA) 18 corresponds to the input output device. Also included in the system is a program mode control circuit (PMCTL) 27, a receiver 28, a first-in first-out memory (FIFO) 29 for recording access information for the group of the control registers 18a, an access information display circuit (PMACT) 30 for displaying whether or not the access information is recorded in the first-in first-out circuit, a direct memory access circuit (DMAC) 31, and a bus arbitration control circuit (ABTCTL) 32.

Figure 4:
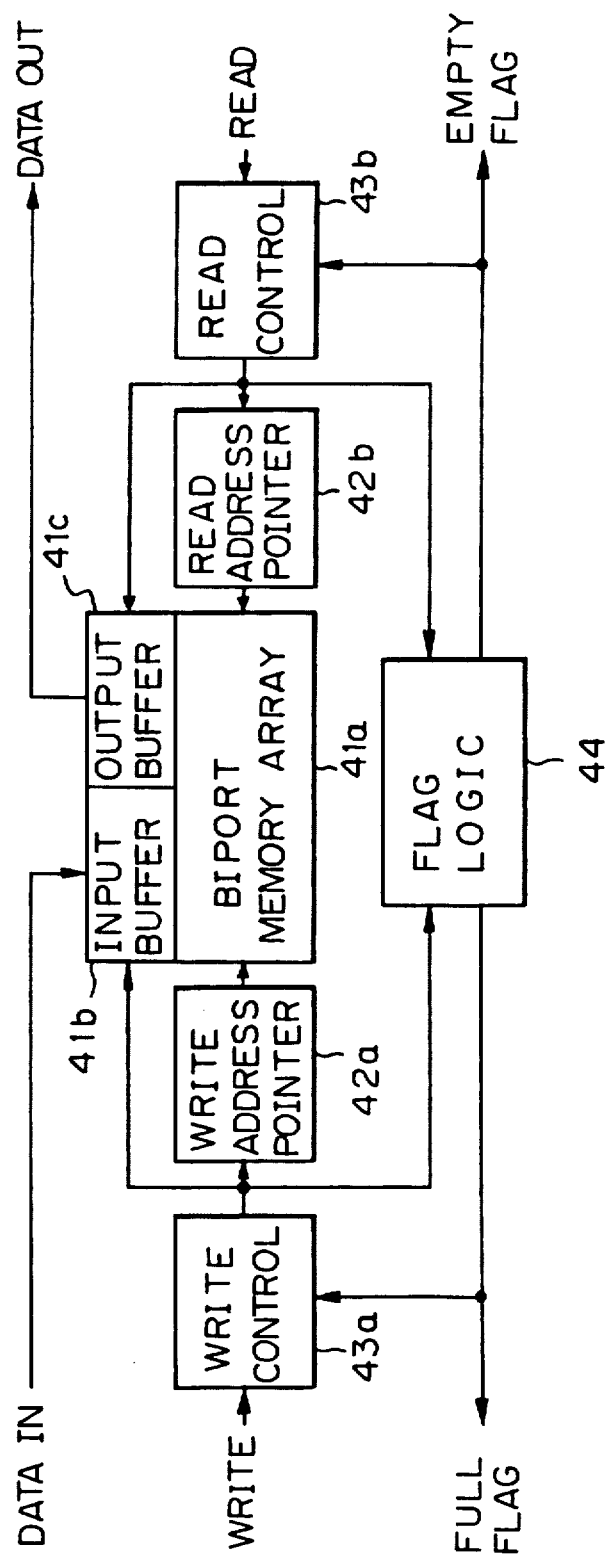
FIG. 4 is a block diagram of a first-in first-out circuit (FIFO) shown in FIG. 3.

FIG. 4 shows an example of the FIFO circuit 29 of FIG. 3. In FIG. 4, the FIFO circuit includes a biport memory array 41a, an input buffer 41b an output buffer 41c a write address pointer 42a and a read address pointer 42b, a write control 43a and a read control 43b, and a flag-logic 44. The FIFO is applied as a rate buffer for sourcing and absorbing data at different rates, (e.g. interfacing first processors and slow peripherals). The full and empty flag are provided to prevent data overflow and underflow. The data is loaded and emptied on FIFO basis. The latency for the retrieval of data is approximately one load cycle (write). Since the write and read operations are internally sequential, address information is not required. The ninth bit, for example, is provided to support control or parity functions. The FIFO shown in FIG. 4 employs a memory-based architecture wherein a byte written into the FIFO is stored at the biport memory array, where it remains until overwritten. The address pointers automatically generate the addresses required for each read and write operation. The empty/full flag circuit prevents illogical operations, such as reading un-written bytes or over-writing un-written bytes. Once a byte stored at a given address has been read, it can be over-written. Address pointers loop back to address zero after reaching final address. The empty/full status of the FIFO is therefore a function of the distance between the pointer, not of their absolute location. As long as the pointers do not overlap, the FIFO can be written and read continuously without ever becoming full or empty. Resetting the FIFO resets the address pointers to address zero.

Figure 5:
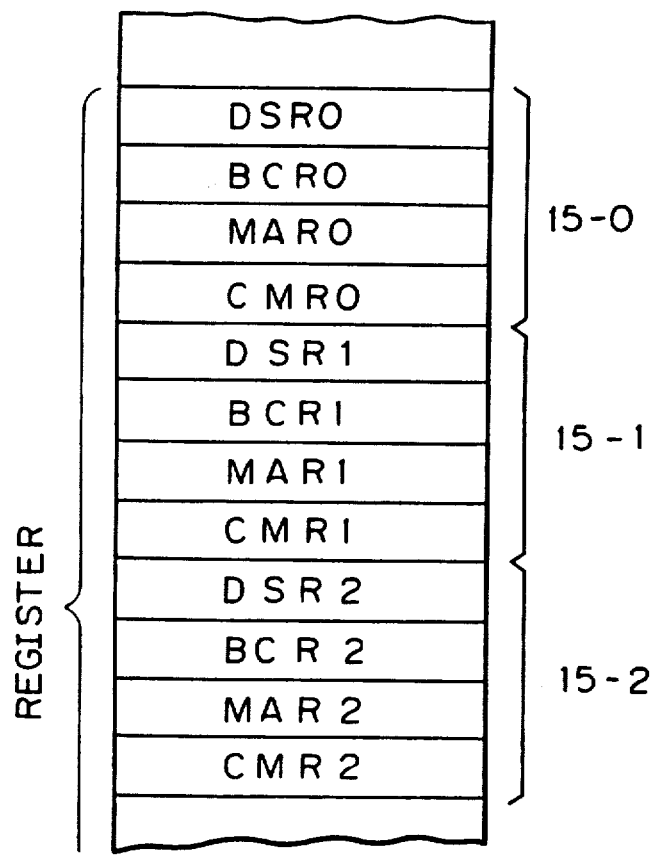
FIG. 5 is a diagram showing register regions (REGA) shown in FIG. 3.

Referring back to FIG. 3, each kind of the input output device 15a, 15b, . . . 15n is connected to the input output device interface circuit 21 of the input output control device 14. The and the group of the control registers 18a corresponding to these input output devices 15a, 15b, . . . , 15n is formed in the random access memory 18. The group of the control registers 18a is formed, for example, as shown in FIG. 5, by device status registers DSR, byte counter registers BCR, memory address registers MAR, command registers CMR, etc. In these the last figures 0, 1, 2, . . . of each symbol correspond to the last figure of the symbol of the input output device.

The random access memory 18 can be accessed from the central processing unit 23 via the processor bus 25, the channel device 26, the common bus 13, the receiver driver 20 and the internal processor bus 16. In this case, the bus arbitration control circuit 33 controls the right to use the internal processor bus 16 according to information from the program mode control circuit 27, so that access from the channel device 26 via the receiver driver 20 is possible. For example, the control information can be written in the group of control registers 18a.

Figure 6:
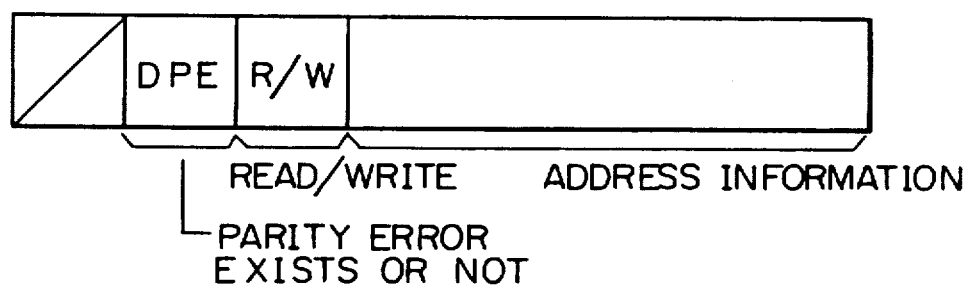
FIG. 6 is a diagram explaining an internal definition of the FIFO shown in FIG. 3.

The access information for the group of the control registers 18a is recorded in the first-in first-out memory (FIFO). This FIFO is formed, for example as shown in FIG. 6. The bit DPE shows whether or not the parity error exists, the read write bit R/W showing whether the data is read from the input output device or the data is written therein, as address information on the random access memory 18. The number of records (memory capacitance) can be selected according to difference between the speed of direct access from the host device to the group of the registers 18a in the random access memory 18 and the speed of processing of the microprocessor 17.

Next, an explanation is given of the case when the control information is written in the group of the control registers 18a.

The central processing unit 23 executes the program stored in the main memory device 24 and writes (via the channel device 26) the control information to the group of the control registers 18a.

The input output control device 14 is thus accessed from the channel device 26 via the common bus 13. Also, the input output device 16 sends a request for the right to use the random access memory 18 (the right to use the internal processor bus 16) to the bus arbitration control circuit 33 by the program mode control circuit 27.

When the bus arbitration control circuit 33 obtains (from the microprocessor) the right to use the internal processor bus 16, an acknowledgement is sent to the program mode control circuit 27.

The program mode control circuit 27 then sets the control information to the group of the control registers corresponding to the input output device of the random access memory 18, via the receiver driver 20 and the internal processor bus 16.

Simultaneously with the setting of this control information, the access information such as shown in FIG. 6 on the common bus 13 is recorded at the FIFO 29.

When the program mode access on the common bus 13 is finished, the bus arbitration control circuit 33 returns the right to use the internal processor bus 16 to the microprocessor 17.

When the microprocessor 17 obtains the right to use the internal processor bus 16, it reads the content of the display circuit 30 showing whether or not access information and discriminates whether the access information is recorded in the FIFO. When the access information is recorded therein, the microprocessor 17 reads the access information already recorded in the FIFO. BY the address information and the read write bit R/W, the group of registers corresponding to the input output device and the kind of access are recognized.

Based on the access information read from the FIFO 29, the microprocessor 17 reads the content of the group of the control registers 18a, and controls the input output device corresponding to the address information.

If this control includes the finish of the operation of the input output device, the necessary information is set in the group of control registers and an interrupt is made at the common bus 13. Then, the usual interruption process is executed.

When the group of the registers 18a is read out, the input output control device 14 is accessed from the channel device 26 via the common bus 13. In this case, sometimes the actual state of the input output device and the content of the group of the control registers 18a are different. However, as the microprocessor 17 reads the newest state information from the input output device, so as to renew the group of the control registers 18a, the renewed content can be read at the time of the read operation of the next program mode.

When the control information is rapidly set, for example, corresponding to the input output devices 15-0, 15-1, to the above-mentioned control register 18a, "10" is set in the byte count register BCR0, and "AAA" is set in the memory address register MAR0. The command which reads the data of the input output device 15a is set in the command register CMR0, "20" is set in the byte count register BCR1, and "BBB" is set in the memory address register MAR1. The command which transfers the data to the input output device 15b is set in the command register CMR1. When the access information is recorded in the access information display circuit 30, this is read by the microprocessor 17 so as to read the access information for the above-mentioned input output device 15-0 recorded previously in the FIFO. By this reading, the access information previously recorded in the FIFO 29 is cleared.

As the address information on the random access memory 18 can be known by the access information read from the FIFO 29, the control information set in the group of the control register 18a can be read. As the content of the command register CMR0 commands a transfer of the data of the input output device 15 to the main memory device 24, the direct memory access control circuit 31 is started and the necessary information for the transfer control of the byte count register BCR0, the memory address register MAR0, etc., is transferred to the direct memory access circuit 31.

The direct memory access control circuit 31 sends a request to the bus arbitration circuit 33 for the right to use the internal processor bus 16. When the bus arbitration control circuit 33 obtains the right to use the internal processor bus 16 from the microprocessor 17, it then sends an acknowledgement of this right to use the internal processor bus 16 to the direct memory access control circuit 31. Then, the direct memory access control circuit 31 transfers the data of the input output device 15-0 to address AAA of the main memory device 24, byte by byte. When 10 bytes are completely transferred, the control circuit 31 returns the right to use the internal processor 16 to the microprocessor 17.

Since the acess information display circuit display shows that the access information still exists, the microprocessor 17 reads the next access information of the FIFO 29, reads the control information set in the group of the control registers 18a according to the access information, and clears the access information of the FIFO 29. In this case, as is well known, the data is transferred, according to the content of the command register CMR1, from the main memory device 24 to the input output device 15-1. Also, in this case, as already mentioned, the direct memory access control circuit 31 is activated. After obtaining the right to use the internal microprocessor 16 by the control of the bus competition control circuit 32, the 20 bytes of data are transferred from the address BBB of the main memory device 24 set in the memory address register MAR1 to the input output device 15-1, one byte by one byte.

When the control information is written only in the group of control registers corresponding to the two input output devices 15-0 and, if the last access information is read out from the FIFO 29, the access information display circuit 30 shows that no access information exists. Thus, the microprocess 17 does not carry out the control for reading the access information from the FIFO 29.

In the data transfer control due to the direct memory access control circuit 31 mentioned above, when the buffer memory is provided in the input output device 14 and this buffer memory is connected to the common bus 13, the construction in which the data can be transferred via this buffer memory with the main memory device can be obtained. Further, the number of input output devices which can be connected to one input output device can be selected by consideration of the speed, etc., of the microprocessor 17. The region of the group of the control register 18a is set in the random access memory 18, corresponding to the maximum connectable number. Alternatively, it can be set case by case corresponding to the connected number.

Figure 7:
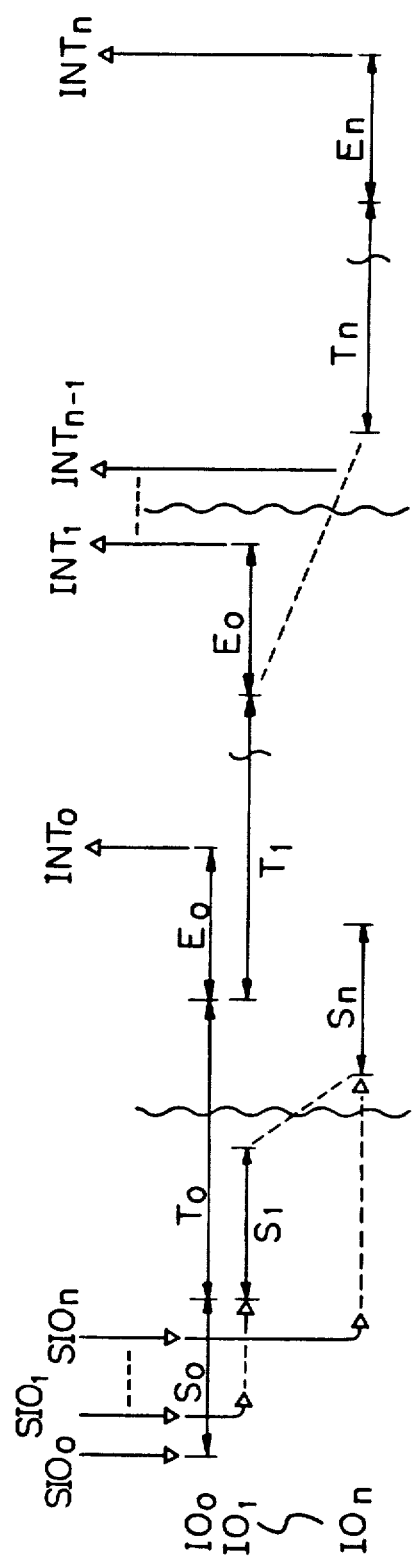
FIG. 7 is a time chart for explaining the operation of the system shown in FIG. 3.

Fig. 7 is a time chart for explaining the transfer of the data in the device shown in FIG. 3. In FIG. 7, $SIO_0$--$SIO_n$ are commands, $INT_0$-$INT_n$ interruptions, $S_0$-$S_n$ start sequences, $T_0$-$T_n$ data transfer sequences, $E_0$-$E_n$ end sequences, and $IO_0$-$IO_n$ input output devices.

In the time chart shown in FIG. 7, the following points should be noted.

(a) When one IO is in the data transmitting state ($IOC < \rightarrow IO_i$), another IO cannot enter the data transmission sequence.

(b) Similarly, when one IO is in the start sequence or in the end sequence, another IO cannot enter the same kind of sequence as the first-mentioned IO.

(c) When the sequences are different, these different sequences can be processed in parallel. For example, when $IO_0$ is in the $T_0$ sequence, an $S_1$ sequence of $IO_1$ can be processed, and when $IO_0$ is in the $E_0$ sequence, $IO_1$ can enter the $T_1$ sequence and $IO_n$ can enter the $S_n$ sequence.

FIG. 8 is a flow chart of the operation of the system shown in FIG. 3. As shown in FIG. 8, the start sequence is formed by blocks 51-60, the data transfer sequence is formed by blocks 61-67, and the end sequence is formed by blocks 68-71.

In the start sequence, when the start command for $IO_i$ is received by the IOC from the host device (block 51), the command is transmitted from the PMCTL to the MPU in block 52. Then, the access information is set in the FIFO. When the control register is in the write state in the program mode, the control information ($BCR_i$, $MAR_i$, $CMR_i$) for the corresponding $IO_i$ is set in the REGA 18a on RAM 18. The MPU reads the FIFO and checks the history of the access from the host in block 53 and the MPU checks the PMACT in block 54. When the FIFO is empty (block 55), the process is transferred to block 56. When the FIFO is not empty, the process is returned to block 53. In block 56, the MPU reads the control information $BCR_i$, $MAR_i$, CMR$_i$, etc., of the IO$_i$ on the REGA. When the program mode is for a write operation in block 57 and a CMR write exists in block 58, the MPU analyzes the CMR$_i$ command corresponding IO$_i$. If a right to the CMR from the host does not exist, for example, only the right to the BCR, MAR exists, the MPU does not start the corresponding IO$_i$ but recognizes only the access from the host, and the process is ended. In block 59, when the DSR is in the read access mode, the DSR information corresponding to IO$_i$ is read and is set in the DSR corresponding to IO$_i$ on the REGA 18$a$.

In the data transfer sequence, the MPU issues a start command to the corresponding IO$_i$ in accordance with the command CMR in block 61. When the block 62 is in the read system command mode, i.e., the data is transferred in the direction of IO→IOC→(DMAC)→Host (CH-MM), the process is transferred to block 63, and if not, the process is transferred to block 65. In blocks 63 and 66, the data transfer between IO$_i$ and IOC (RAM) is carried out by the DMA, or the MPU carried out a read and write for the IO$_i$ at every one unit transfer. In blocks 64 and 65, the command for the MAR, BCR and the transfer direction, etc., are supplied to DMAC, to start the DMA. It is recognized that the other IO should be started in the block 67, and the process is returned to block 61.

In the end sequence, the MPU transfers the interruption process to the host in block 68. In block 69, a complete bit of DSR$_i$ in set is the case of the normal end. In block 70, the host reads the DSR$_i$ of the corresponding IO$_i$ on the REGA on RAM and recognizes the end (normal) of the command. When it is recognized that an interruption is not required in block 71, the process is finished.

As already mentioned, in the present invention, the group of the control registers 18$a$ is formed in the random access memory 18. The access information for this group of the control registers 18$a$ is recorded in the FIFO 29, and the microprocessor 17 reads this access information of the FIFO 29 so as to read the content of the group of the control registers 18$a$. Therefore, if a high speed access is carried out from the control processing device to the group of the control registers due to a random access or chain command, the access information is recorded in the FIFO 29, then the microprocessor 23 can access the group of the control registers 18$a$ by reading the access information recorded in the FIFO 23 corresponding to its operation velocity. Therefore, by forming the group of the control registers 18$a$ in the random access memory 18, the construction becomes relatively simple, and a plurality of kinds and numbers of input output devices can be controlled by one input output control device.

We claim:

1. An input output control system having a master device containing a central processing unit, a main memory unit and a channel unit, and an input output control device which carries out an interface control with a plurality of input output devices under control of said master device through said channel unit which is connected to said input output control device via a common bus, said input output control device comprising:

a microprocessor for controlling interface circuits respectively with said common bus and said plurality of input output devices by firmware stored in a read only memory;

a random access memory in communication with the common bus and providing a working memory and storing therein a plurality of control registers, each representing control information about said plurality of input output devices, said random access memory being directly accessible by said master device through said common bus interface circuit via said common bus;

an internal processor bus connected to said microprocessor, said read only memory and said interface circuits for said common bus and said plurality of input output devices;

a first-in first-out memory being further connected between said common bus and said internal processor bus, for recording a history of a program mode access from the master device to the control registers as access information for the control registers;

a fifo for storing a history in parallel with said program mode access of said control registers, an address information on said common bus corresponding to each of said control registers haivng data which is recorded in access order in said memory;

said access information recorded in said memory being readable by said microprocessor, the content of said control registers being read out or renewed by said microprocessor which distinguishes one of said control registers in accordance with said address information in said access information, so that a specified input output device among said plurality of input output devices is controlled.

2. An input output control device according to claim 1, wherein each unit of said control registers part is based on information stored in a device status register (DSR), said DSR storing condition of each of said input output devices, a byte count register (BCR) specifying number of bytes the transmitted information, a memory address register (MAR) specifying an address of information written in said main memory unit or information read out therefrom and a command register (CMR) specifying a read or write operation, to each of said input output devices.

3. An input output control device according to claim 1, wherein each of said access information recorded in said memory further includes a status bit region for displaying whether or not a parity error for control information is detected in a parity checking circuit within said common bus interface circuit in setting said control information in to one of said control registers by said program mode access, and a region of read/write bit for indicating whether said program mode access for each of said control registers is a read operation or write a operation.

4. An input output control system having a master device containing a central processing unit, a plurality of input output devices and an input output control device which carries out an interface control with said plurality of input output devices under control of said master device, said input output control device comprising:

a microprocessor for controlling transfer of data between the input output devices and the master device;

a random access memory (RAM) including control registers representing control information for each of said plurality of input output devices, said RAM being directly accessible by said master device;

an internal processor bus connected to said microprocessor, said random access memory and said plurality of input output devices to permit access of the microprocessor to the RAM;

a first-in first-out (FIFO) memory being directly accessible by both said master device and said microprocessor for recording a history of a program mode access from the master device to the control registers as access information for accessing the control registers;

said master device storing the access information, in access order, in said first-in first-out memory in parallel with program mode access of said control registers;

said access information recorded in said first-in first-out memory being readable by said microprocessor, the content of said control registers being read out or renewed by said microprocessor in accordance with address information, so that a specified input output device among said plurality of input output devices is controlled.

5. An input output control device according to claim 4, wherein each of the control registers is based on information stored in a device status register (DSR), said DSR storing condition of each of said input output devices, a byte count register (BCR) specifying a number of bytes of the transferred information, a memory address register (MAR) specifying an address of information written in a memory of the master device or information read out therefrom and a command register (CMR) specifying a read or write operation, to each of said input output devices.

6. An input output control device according to claim 4, wherein each of said access information recorded in said first-in first-out memory further includes a status bit region for displaying whether or not a parity error for control information is detected during the program mode access for setting said control information in to one of said control registers, and a region of read/write bit for indicating whether said program mode access for each of said control registers is a read operation or write a operation.

7. An input output control device according to claim 4, wherein said input output control device further comprises an access information display circuit, monitored by said microprocessor, for indicating whether or not the access information from the master device is stored in the first-in first-out memory, said microprocessor reading out the access information from the first-in first-out memory when said access information display circuit indicates that the access information is stored in the first-in first-out memory.

* * * * *

UNITED STATES PATENT AND TRADEMARK OFFICE
CERTIFICATE OF CORRECTION

PATENT NO.   : 5,062,073                          Page 1 of 4
DATED        : October 29, 1991
INVENTOR(S)  : Masuda et al.

It is certified that error appears in the above-identified patent and that said Letters Patent is hereby corrected as shown below:

On the title page
    Item [54]    before "INPUT" insert --AN--.
  Before "OTHER PUBLICATIONS" insert the following:
      --FOREIGN PATENT DOCUMENTS

| | | |
|---|---|---|
| 0,185,098 | 5/85 | EPA |
| 0,125,561 | 5/84 | EPA |
| 8,201,675 | 12/82 | EPC--. |

COL. 1,   line 1, before "INPUT" insert --AN--;
           line 30, "device, a" should be --device. A--;
           line 57, after "Thus" insert a comma.

COL. 2,   line 1, after "Thus" insert a comma;
           line 8, "device, in which" should be --device in which,--;

UNITED STATES PATENT AND TRADEMARK OFFICE
CERTIFICATE OF CORRECTION

PATENT NO. : 5,062,073
DATED : October 29, 1991
INVENTOR(S) : Masuda et al.

It is certified that error appears in the above-identified patent and that said Letters Patent is hereby corrected as shown below:

line 30, "memory," should be --memory.--;

line 31, "access" should be --Access--.

COL. 3,   line 2, "4 a" should be --4. A--;

line 5, delete ", and";

line 29, "In the case, that" should be --In that case,--;

line 44, "$SIO_0$-$SIO_n$" should be --$SIO_0 \sim SIO_n$--; and "-" (second occurrence) should be -- $\sim$ --;

line 45, "-" (both occurrences) should be -- $\sim$ --;

line 46, "-" should be -- $\sim$ --;

COL. 4,   line 10, "a control a" should be --a system for controlling a--;

line 29, "and" should be --an--.

COL. 5,   line 12, "3, 23 is" should be --3--;

line 16, "etc., 18 is" should be --etc., and--;

line 18, delete "is a";

UNITED STATES PATENT AND TRADEMARK OFFICE
CERTIFICATE OF CORRECTION

PATENT NO. : 5,062,073  Page 3 of 4
DATED : October 29, 1991
INVENTOR(S) : Masuda et al.

It is certified that error appears in the above-identified patent and that said Letters Patent is hereby corrected as shown below:

line 19, "device" should be --devices--;
      line 30, after "41b" insert a comma;
      line 38, before "FIFO" insert --a--;
      line 62, "The and the group of the" should be --The group of--.

COL. 6,   line 18, "exists, the" should be --exists. The--, and change "showing" to --shows--;
      line 60, after "mation" insert --exists--;
      line 64, "BY" should be --By--.

COL. 8,   line 8, delete "one" (both occurrences);
      line 11, after "and" insert --15-1--;
      line 32, "--" should be -- ˜ --;
      line 33, "-" should be -- ˜ --;
      line 34, "-" (both occurrences) should be -- ˜ --;
      line 35, "-" should be -- ˜ --;
      line 39, "< →" should be -- ←--→ --;
      lines 52, 53, and 54, "-" should be -- ˜ --; .

UNITED STATES PATENT AND TRADEMARK OFFICE
CERTIFICATE OF CORRECTION

PATENT NO. : 5,062,073

DATED : October 29, 1991

INVENTOR(S) : Masuda et al.

Page 4 of 4

It is certified that error appears in the above-identified patent and that said Letters Patent is hereby corrected as shown below:

COL. 9, line 29, "in set is the" should be --is set in the--;

COL. 10, line 6, "said" should be --a--; and
line 21, "haivng" should be --having--.

Signed and Sealed this

Thirtieth Day of March, 1993

*Attest:*

STEPHEN G. KUNIN

*Attesting Officer*

Acting Commissioner of Patents and Trademarks